United States Patent [19]
Gillery

[11] 3,981,293
[45] Sept. 21, 1976

[54] SOLAR HEAT COLLECTOR

[75] Inventor: Frank Howard Gillery, Allison Park, Pa.

[73] Assignee: PPG Industries, Inc., Pittsburgh, Pa.

[22] Filed: Mar. 13, 1974

[21] Appl. No.: 450,702

[52] U.S. Cl. .............................................. 126/271
[51] Int. Cl.² ............................................ F24J 3/02
[58] Field of Search ........................... 126/270, 271

[56] References Cited
UNITED STATES PATENTS

| | | | |
|---|---|---|---|
| 2,917,817 | 12/1959 | Tabor | 126/270 |
| 3,000,375 | 9/1961 | Golay | 126/270 |
| 3,176,678 | 4/1965 | Langley | 126/270 |
| 3,176,679 | 4/1965 | Langley | 126/270 |
| 3,227,153 | 1/1966 | Godel et al. | 126/271 |
| 3,272,986 | 9/1966 | Schmidt | 126/270 |

OTHER PUBLICATIONS
*Physica Status Solidi*, vol. 14, 1966, pp. 69–75.
*Phillips Tech. Review*, vol. 26, 1965, pp. 105–111.
Tabor, H., "Selective Radiation," Bull. Res. Counc. of Israel, vol. 5A, 1956, pp. 119–128.

*Primary Examiner*—William E. Wayner
*Attorney, Agent, or Firm*—Donald Carl Lepiane

[57] ABSTRACT

Disclosed is a solar heat collector having a cover plate mounted in spaced relation to a solar energy absorber. The cover plate has a transmittance coefficient ($t$) for solar radiation e.g., in the wavelength range of about 0.3 to 2.1 microns, and a reflectance coefficient ($r$) for infrared energy in the wavelength range of about 2 to 15 micron. The transmittance coefficient and reflectance coefficient of the cover plate are selected such that the product of ($r$) and ($t$) is equal to or greater than about 0.25 to increase the saturation temperature ($T_s$) of the solar heat collector.

11 Claims, 5 Drawing Figures

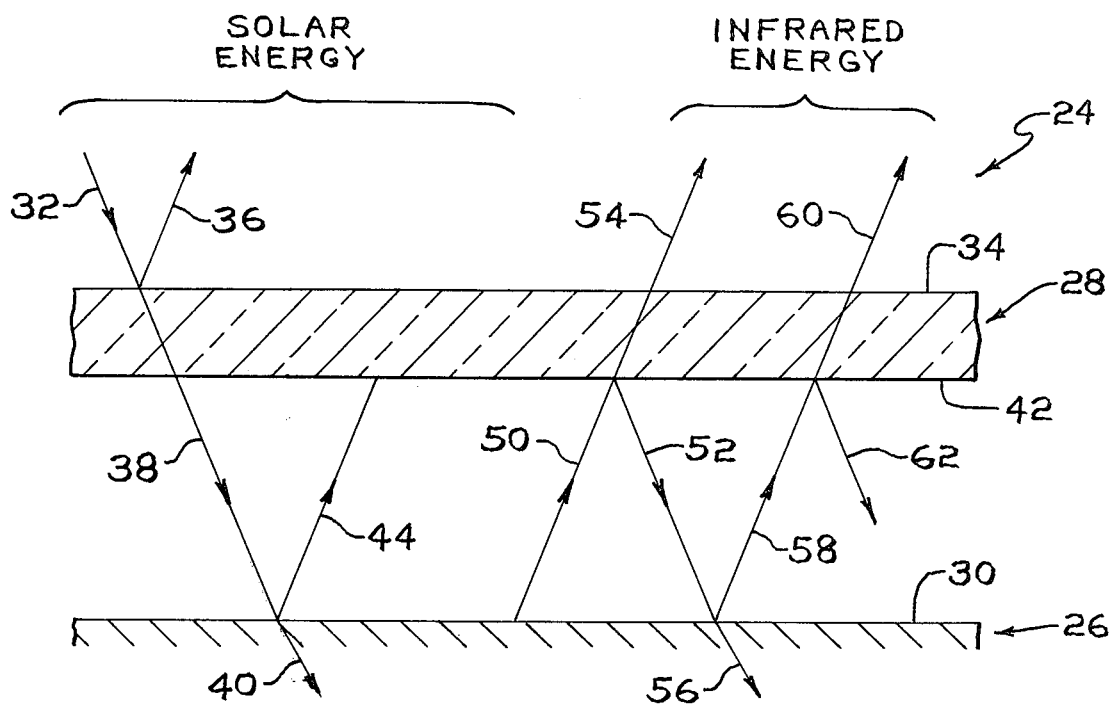
FIG. 2
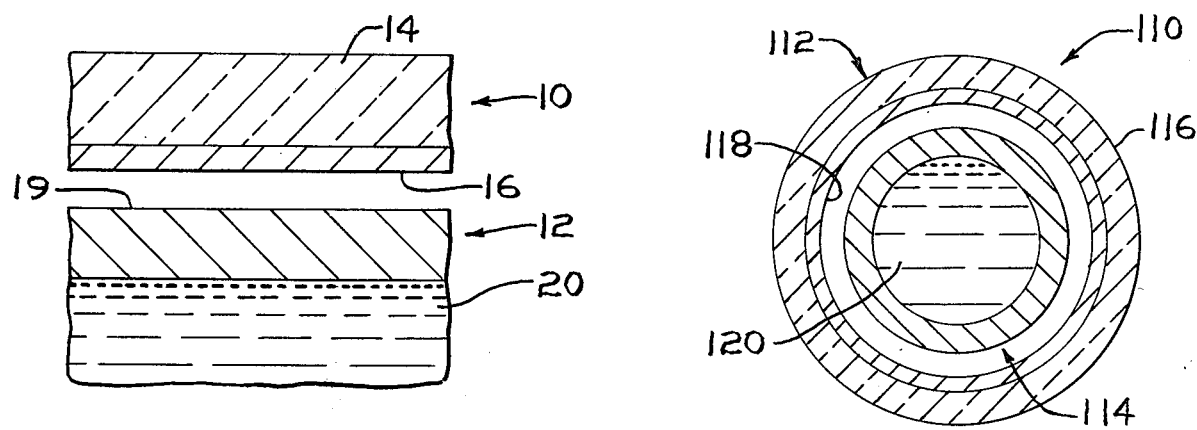
FIG. 1
FIG. 5

SOLAR HEAT COLLECTOR

RELATED APPLICATION

The teachings of U.S. patent application Ser. No. 450703 filed even date in the name of Pandit G. Patil and entitled "Solar Heat Collector Window" may be used in the practice of the invention and the teachings thereof are hereby incorporated by reference.

BACKGROUND OF THE INVENTION

1. Field of the Invention

This invention relates to a solar heat collector having a cover plate mounted in spaced relation to a solar energy absorber.

2. Description of the Prior Art

The advantages of using solar heat collectors to collect solar energy for heating a fluid and/or for generating electric power have been recognized in the prior art. For example, advantages and embodiments of prior art solar heat collectors are discussed in (1) an article entitled "Solar Energy Researchers Try A New Way" *Business Week*, June 12, 1971, page 72; (2) an article entitled "Solar Energy: A Feasible Source of Power?", *Science*, Volume 172, page 660; and (3) U.S. Pat. No. 2,888,007.

In general, there is disclosed in the above-mentioned patent a window for admitting and trapping solar radiation including a cover plate, a receiver and a glass plate mounted in spaced, parallel relation in an insulated box.

The inner surface of the cover plate is ribbed to form a series of continuous, parallel, substantially cylindrical lenses which lenses focus the sun's rays on a focal plane in the box. The glass plate is disposed in the box between the cover plate and the receiver. The surface of the glass plate adjacent the receiver lies in the focal plane and is selectively coated with a mirror face to provide the surface with a number of slots equal to the number of lenses on the cover plate.

The solar energy passes through the slots and strikes the receiver surface. Solar energy that is not absorbed by the receiver is reflected from the receiver to the mirror face of the glass plate which, in turn, reflects the solar energy back toward the receiver.

The window as disclosed in the above-mentioned patent has disadvantages. For example, a portion of the energy not absorbed by the receiver escapes through the slots. Another disadvantage is that the window has to be built with precision. More particularly, the slots on the glass plate have to be as small as possible to prevent the reflected energy from the receiver from passing therethrough and the glass plate has to be positioned in the focal plane for maximum efficiency. A third drawback is that the window has to be rotated in coordination with the movement of the sun and/or the glass plate laterally displaced relative to the receiver so that the sun's rays, which travel in a straight line, impinge on the cover plate lenses and are concentrated at the focal plane. A fourth drawback is that the coating on the glass plate has been found to peel as the temperature of the window increases. When this occurs, the reflectance of the glass plate decreases and an increased amount of energy escapes from the window.

It would be advantageous, therefore, if a solar heat collector were provided that did not have the drawbacks of the prior art.

SUMMARY OF THE INVENTION

This invention relates to a solar heat collector and method of making same. The solar heat collector includes a solar energy absorber and a cover plate. Facilities are provided for mounting the cover plate in spaced relation to the absorber. The cover plate has a transmittance coefficient ($t$) for solar radiation e.g., in the wavelength range of 0.3 to 2.1 microns, and a reflectance coefficient ($r$) for infrared radiation in the wavelength range of about 2 to 15 microns. The transmittance coefficient and reflectance coefficient are selected such that the product of ($r$) and ($t$) is equal to or greater than about 0.25.

In one embodiment, the cover plate includes a piece of commercial-soda-lime glass having a tin oxide coating of 2,300 angstroms.

BRIEF DESCRIPTION OF THE DRAWING

FIG. 1 is a partial cross sectional view of a solar heat collector constructed in accordance with teachings of the invention;

FIG. 2 is an illustrative view of the radiation energy balance of a solar heat collector having a cover plate;

FIG. 5 is a cross sectional view of a solar heat collector conduit constructed in accordance with the teachings of the invention.

DETAILED DESCRIPTION OF THE INVENTION

Figure 3:
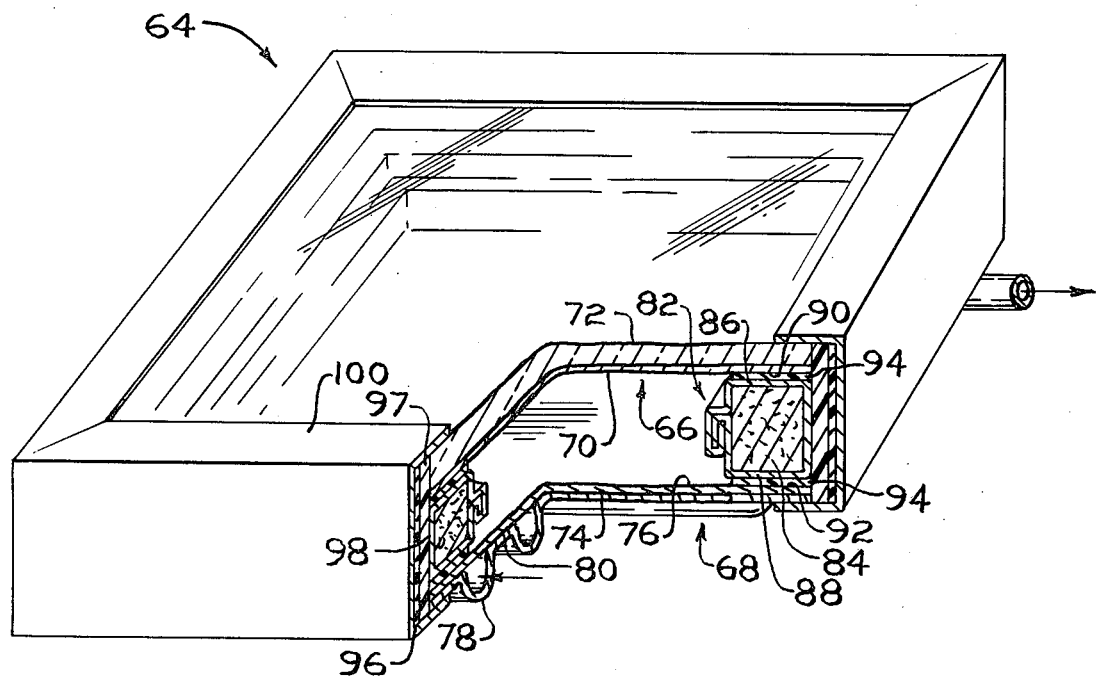
FIG. 3 is an isometric view of a solar heat collector window constructed in accordance with the teachings of the invention and having portions removed for purposes of clarity.

With reference to FIG. 1, this invention, in general, relates to a solar heat collector including a cover plate 10 mounted in spaced relation to a solar heat absorber 12. The cover plate 10 e.g., a glass plate 14, has a coated surface 16 which (1) has a transmittance coefficient ($t$) to solar radiation e.g., in the wavelength range of about 0.3 to 2.1 microns, (2) has a reflectance coefficient ($r$) to infrared energy in the wavelength range of about 2 to 15 microns, and (3) has a product of transmittance and reflectance i.e. ($tr$) equal to or greater than about 0.25.

The absorber 12 has a surface 18 that is either a selective surface or a non-selective surface. A "selective surface", as the term is used herein, is a surface that has an absorption coefficient for solar radiation that is different from its emissivity coefficient for infrared energy. An example of a selective surface is a copper oxide surface which has an absorptivity coefficient of 0.95 for solar energy and an emissivity coefficient of 0.41 for infrared energy. A "non-selective surface", as the term is used herein, is a surface that has an absorptivity coefficient for solar energy that is equal to the emissivity coefficient for infrared energy. An example of a non-selective surface is a black surface which has an absorptivity coefficient of 0.95 for solar energy and an emissivity coefficient of 0.95 for infrared energy.

Preferably, the absorber 12 is made of a heat conductive material e.g., copper or aluminum. As the absorber 12 absorbs solar radiation, it is heated and heats a heat absorbing medium 20 e.g., water; a mixture of ethylene glycol and water; or pressurized water by conduction.

The cover plate of this invention can be made by coating a surface of a piece of glass e.g., commercial-soda-lime glass, or borosilicate glass with a coating of tin oxide or indium oxide. The nature and composition of various silica glasses is well known in the art and is described, for example, in the *Encyclopedia of Chemical Technology*, By Kirk Othmer, published by Interscience Encyclopedia Inc., New York, New York, volume 7, pages 181-189. The glass can be made by the commercially wellknown-processes such as, for example, the Float Process for making float glass as described in U.S. Pat. No. 3,083,551 to Pilkington, the Pittsburgh Process, also known as the PENNVERNON Process (registered trademark of PPG Industries Inc.), to make sheet glass as described in U.S. Pat. Nos. 1,833,379, 1,833,380, 1,883,381 and 1,833,382, all to Spinasse, and the Continuous Plate Process for making plate glass as typically described in U.S. Pat. Nos. 2,478,090 and 2,505,103, both to Devol.

A soda-lime-silica glass having the following glass composition: $Na_2O$, 10-15 percent by weight; $K_2O$, 0-5 percent by weight; CaO, 5-15 percent by weight; $SiO_2$, 65-75 percent by weight; MgO, 0-10 percent by weight; $B_2O_3$, 0-5 percent by weight; $Al_2O_3$, 0-1 percent by weight and $Fe_2O_3$, 0-1 percent by weight made by the Float Process is preferred, because it has the best combination of optical quality coupled with economic production cost, currently known.

Methods of coating a piece of glass with tin oxide sold under the trademark Nesa owned by PPG Industries, Inc., are taught in U.S. Pat. Nos. 2,566,346; 3,107,177 and 3,677,814 which teachings are hereby incorporated by reference. Methods of coating a piece of glass with indium oxide, sold under the trademark Nesatron owned by PPG Industries, Inc., are taught in U.S. Pat. Nos. 3,447,936; 3,506,557 and 3,655,545; which teachings are hereby incorporated by reference.

As can be appreciated, varying parameters such as (1) type of coating, (2) coating thickness, (3) type of glass and (4) thickness of the glass varies the transmittance coefficient ($t$) and reflectance coefficient ($r$).

In this regard, consider the following. As the coating thickness increases, the remaining parameters kept constant, the reflectance coefficient increases as the transmittance coefficient decreases. As the constituents to make the glass plate vary, the remaining parameters kept constant, the reflectance coefficient and transmittance coefficient varies. For example, as iron content ($Fe_2O_3$) in commercial soda lime glass increases, e.g., from a range of 0.1 - 0.2 percent to a range of 0.5 - 0.6 percent the transmittance coefficient to solar energy decreases e.g., from 0.90 to 0.75. As the thickness of the glass increases, the remaining parameters kept constant, the transmittance coefficient and the reflectance coefficient can be varied. For example, as the thickness of commercial-soda-lime glass increases, the transmittance coefficient decreases while the reflectance coefficient remains constant. As the type of coatings vary, the remaining parameters kept constant, the reflectance coefficient and transmittance coefficient can be varied.

In the following discussion, different types of cover plates having a transmittance coefficient ($t$) for solar radiation e.g., in the wavelength range of about 0.3 to 2.1 microns, (2) a reflectance coefficient ($r$) for infrared energy in the wavelength range of about 2 to 15 microns and (3) a product ($rt$) which is equal to or greater than about 0.25 will be presented. As can be appreciated, the invention is not limited thereto.

A commercial-soda-lime glass about ¼ inch thick having a tin oxide coating of about 2,000 - 5,000 angstroms has (1) a transmittance coefficient ($t$) for solar radiation of about 0.65 - 0.55; (2) a reflectance coefficient ($r$) for infrared energy in the wavelength range of about 2 to 15 microns of about 0.75 - 0.80; and (3) an ($rt$) of about 0.49 - 0.44.

A commercial-soda-lime glass about ¼ inch thick having an indium oxide coating of about 1,000 - 20,000 angstroms has (1) a transmittance coefficient ($t$) for solar radiation of about 0.78 - 0.73; (2) a reflectance coefficient ($r$) for infrared energy in the wavelength range of about 2 to 15 microns of about 0.50 - 0.90; and (3) an ($rt$) of about 0.39 - 0.66.

A piece of borosilicate glass about ¼ inch in thickness having a tin oxide coating of about 2,000 - 5,000 angstroms has (1) a transmittance coefficient ($t$) for solar radiation of about 0.80 - 0.70; (2) a reflectance coefficient ($r$) for infrared energy in the wavelength range of about 2 to 15 microns of about 0.75 - 0.80; and (3) an ($rt$) of about 0.60 - 0.56.

A piece of borosilicate glass about ¼ inch in thickness having an indium oxide coating of about 1,000 - 20,000 angstroms has (1) a transmittance coefficient ($t$) for solar radiation of about 0.85 - 0.80; (2) a reflectance coefficient ($r$) for infrared energy in the wavelength range of about 2 to 15 microns of about 0.50 - 0.90; and (3) an ($rt$) of about 0.43 - 0.72.

The advantages of the solar heat collector of this invention can be appreciated by comparing it to prior art solar heat collectors. Parameter of comparison will now be discussed.

The parameter of comparison will be the ability of the solar heat collector to minimize radiant energy loss i.e., saturation temperature ($T_s$) and, in general, not to the ability of the solar heat collector to minimize heat losses by conduction or convection. Conduction or convection heat losses are normally minimized by mounting the cover plate and absorber in a heat insulating box and/or providing a negative pressure between the cover plate and the absorber.

Saturation temperature ($T_s$) is considered an important parameter because the difference between the saturation temperature and the absorber temperature controls the rate of heat transfer into the absorber.

For simplicity of the following discussion, it is assumed that the absorber surface is a specular surface i.e., the angle of incidence of energy rays is equal to the angle of reflection of reflected energy rays from the surface. Normally, the absorber surface is a non-specular surface and therefore the energy level of the reflected energy ray varies as the angle of reflection varies.

For purposes of the discussion, the solar energy input to a solar heat collector is equal to (1) the energy lost by the solar heat collector by radiation plus (2) the solar energy extracted from the absorber e.g., the energy being used.

The above proposition can be formulated as shown in Equation 1.

$$A \Phi = EJT^4 + Q \qquad (1)$$

where $A$ is the absorptivity coefficient of the absorber surface for solar radiation;

Φ is the solar radiation incident on the absorber surface given in watts cm$^{-2}$ and varies as a function of geographic location, e.g., Φ for the Arizona desert floor has been determined to be 0.087 watts cm$^{-2}$;

$E$ is the emissivity coefficient of the absorber surface at its temperature (T) in degrees Kelvin;

$J$ is the Stefan-Boltzmen constant which is 5.67 × 10$^{-12}$ watts cm$^{-2}$ deg$^{-4}$ Kelvin;

$T$ is the temperature between the differential absorber surface and effective ambient temperature assumed to be the temperature of the environment in degrees Kelvin; and $Q$ is the energy being extracted from the solar heat collector in watts.

When no energy is being extracted from the collector by a heat absorbing medium, temperature (T) of the collector will rise until the energy loss from the collector is equal to the solar energy input to the collector. This temperature is called saturation temperature ($T_s$) which is the differential temperature between the absorber surface and effective ambient temperature. The effective ambient temperature is assumed to be the temperature of the environment. The above proposition can be formulated as shown in Equation 2.

$$T_s = \left( \frac{A}{E} \cdot \frac{\Phi}{J} \right)^{1/4} \quad (2)$$

where the terms $A$, $E$, $\Phi$ and $J$ are as previously discussed; and $T_s$ is the saturation temperature of the solar heat collector.

It will be noted in Equation 2 that for any given geographic location, the saturation temperature varies as a function of the ratio of A/E i.e., the solar absorptivity coefficient of the absorber divided by the infrared emissivity coefficient of the absorber at its temperature.

The absorptivity and emissivity coefficients of the absorber can vary as a function of the temperature of the absorber. Usually, the change is negligible and it is assumed for purposes of the discussion that the absorptivity and emissivity of the absorber remains constant as the temperature of the absorber varies.

With reference to FIG. 2, a general discussion will now be directed to radiation balance of a typical solar heat collector 24 having an absorber 26 and a cover plate 28 e.g., an uncoated piece of glass. Absorber surface 30 has a solar absorptivity coefficient (a) and an infrared emissivity coefficient (e). The cover plate 28 has a transmittance coefficient (t) for solar energy and a reflectance coefficient (r) for infrared energy.

For simplicity of discussion, a single solar energy ray 32 will be considered. The solar energy ray 32, having solar energy Φ, impinges on outer surface 34 of the cover plate 28. A portion of the energy i.e., Φ(1−t) of the ray 32 is lost due to reflectance and absorption and is shown in FIG. 2 as reflected solar energy ray 36. The remaining energy i.e., Φt of the ray 32 passes through the cover plate 28 as transmitted solar energy ray 38. The transmitted ray 38 impinges on absorber surface 30.

The absorber surface 30 absorbs an amount a of the energy Φt of the transmitted ray 38 and is shown as absorbed energy ray 40. The remaining solar energy i.e., Φt (1−a) is reflected toward inner surface 42 of the cover plate 28 and is shown as internally reflected solar energy ray 44.

With reference to Equation 2, and considering the above discussion, the absorptivity coefficient of the absorber surface i.e., A in Equation 2 for a solar heat collector having a cover plate is (at) where (a) is the absorptivity coefficient of the absorber surface and (t) is the transmittance coefficient of the cover plate. Equation 2 becomes Equation 3 for a solar heat collector having a cover plate:

$$T_s = \left( \frac{at}{E} \cdot \frac{\Phi}{J} \right)^{1/4} \quad (3)$$

where the terms $T_s$, $E$, $\Phi$ and $J$ are as previously defined;

($t$) is the transmittance coefficient of the cover plate for solar energy; and ($a$) is the absorptivity coefficient of the absorber surface for solar energy.

With continued reference to FIG. 2, as the absorber absorbs solar energy, it begins to heat up and emit infrared energy. For example, infrared energy ray 50 is emitted having infrared energy JT$^4$e where J and T are as previously discussed and ($e$) is the emissivity coefficient of the absorber surface 30.

When the infrared energy ray 50 impinges on the inner surface 42 of the plate 28, a portion of the infrared energy i.e., (JT$^4$er) is reflected back toward the absorber surface 30 and is shown as first internally reflected infrared energy ray 52. The remaining portion of the infrared energy i.e., [JT$^4$ e (1−r)] is lost to the solar heat collector due to absorption and transmittance through the cover plate 28 and is shown as first transmitted infrared energy ray 54.

The internally reflected energy ray 52 strikes the absorber surface 30 and a portion of the infrared energy of the ray 52 is absorbed by the absorber and is shown as absorbed infrared energy ray 56. The energy of ray 56 is [JT$^4$e r $a_p$] where J, T, e and r are as previously defined and $a_p$ is the absorptivity coefficient of the plate. The absorptivity coefficient of the plate ($a_p$) is equal to the infrared emittance of the plate. Therefore the energy of the ray 56 is also given by the term [JT$^4$e$^2$r]; The remaining portion of infrared energy of the ray 52 as well as re-emitted infrared energy from the absorber surface is directed toward the surface 42 of the cover plate 28 and is shown as second internally reflected energy ray 58. The ray 58 has infrared energy JT$^4$ [e (1−e) r + e$^3$ r]to where the term JT$^4$ [e (1−e)r] is the reflected infrared energy and the term JT$^4$ [e$^3$r] is the re-emitted infrared energy from the absorber surface 30.

The ray 58 impinges on the surface 42 of the cover plate 28. A portion of infrared energy i.e., JT$^4$ [e (1−e)r + e$^3$ r] [1−r] is lost to the solar heat collector 24 and is shown as second transmitted infrared energy ray 60. The remaining portion of energy of the ray 58 is reflected from the surface 42 of the cover plate 22 toward the absorber 26 and is shown as third internally reflected infrared energy ray 62. The infrared energy rays continue to move between the cover plate 28 and the absorber surface 30 to heat the absorber 26 to its saturation temperature ($T_s$).

The infrared energy loss to the solar heat collector 24 due to radiation has a geometric series having the sum:

$$\frac{JT^4e(1-r)}{1-[r(1-e)+e^2r]} \quad (4)$$

The effective emissivity is:

$$E = \frac{e(1-r)}{1-[r(1-e)+e^2r]} \quad (5)$$

where the terms $E$, $J$, $T$, $e$, and $r$ are as previously defined.

Combining Equations 3 and 5 gives Equation 6.

$$T_s = \frac{at}{\frac{e(1-r)}{1-[r(1-e)+e^2r]}} \frac{\Phi}{J} \quad (6)$$

where the terms $T_s$, $a$, $t$, $e$, $r$, $\Phi$ and $J$ are as previously defined.

Equation 2 can be used to determine saturation temperature ($T_s$) for a solar heat collector without a cover plate and Equation 6 can be used to determine the saturation temperature ($T_s$) for a solar heat collector having a cover plate.

Referring to Table I, there is shown a comparison of saturation temperature ($T_s$) for a plurality of solar heat collectors having various types of cover plates mounted in spaced relation to an absorber having an oxidized copper surface. The absorptivity coefficient ($a$) of the absorber surface is 0.95 and the emissivity coefficient ($e$) of the absorber surface is 0.41.

0.25 or greater gives a higher saturation temperature than the prior art solar heat collector.

In the prior art, it is taught that a cover plate having a high reflectance coefficient ($r$) is desirable to trap the infrared energy between the cover plate and the absorber surface. Referring to Table I, Example III, it is shown that gold coated commercial-soda-lime glass has a reflectance coefficient ($r$) of 0.85 to infrared energy in the wavelength range of 2 to 15 microns. However, the saturation temperature ($T_s$) is less than the saturation temperature for uncoated commercial-soda-lime glass, (Example I) and less than the saturation temperature for uncoated borosilicate glass (Example II).

It has been found that improved solar heat collectors can be made when the product of ($r$) ($t$) is equal to or greater than about 0.25. As can be seen from Table I by comparing Examples I, II, and III which are prior art solar heat collectors to Example IV, V, VI, and VII which are solar heat collectors embodying the principles of the invention, that the saturation temperature of the solar heat collectors embodying principles of this invention are higher than the prior art solar heat collectors.

The discussion has not considered in great detail the effect of the absorption coefficient ($a$) and emissivity coefficient ($e$) of the absorber surface. The absorption coefficient is normally considered when the heating efficiency is to be further improved. Referring to Equations 2 and 6, it can be seen that increasing the absorptivity coefficient of the absorber while maintaining a low emissivity coefficient provides a solar heat collec-

TABLE 1

Comparison Of Saturation Temperature For Solar Heat Collector Having Varying Types Of Cover Plates In Spaced Relation To An Absorber Having An Oxidized Copper Surface Having An Absorptivity Coefficient (a) of 0.95 To Solar Energy And An Emissivity Coefficient (e) Of 0.41 To Infrared energy

| Example | Cover Plate ¼ inch thick<br>t = transmittance coefficient of cover plate for solar radiation in the wavelength of 0.3 to 2.1 microns<br>r = reflectance coefficient of the cover plate for infrared energy in the wavelength of 2 to 15 microns | product of (rt) | Saturation Temperature Calculated using Equation 6 and given in (X Φ) | Saturation Temperature ($T_s$) for the solar heat collector positioned on the Arizona desert floor where Φ is 0.087 watts cm$^{-2}$ |
|---|---|---|---|---|
| I | Commercial-soda-lime glass<br>t = 0.77; r = 0.04 | 0.031 | x=32.7 × 10$^{10}$ watts$^{-1}$cm$^2$ deg K$^4$ | 411°K |
| II | Borosilicate glass<br>t = 0.89; r = 0.04 | 0.036 | x=37.9 × 10$^{10}$ watts$^{-1}$cm$^2$ deg K$^4$ | 426°K |
| III | Commercial-soda-lime glass having gold coating 150 angstroms in thickness on a surface<br>t = 0.24; r = 0.85 | 0.20 | x=23.2 × 10$^{10}$ watts$^{-1}$cm$^2$ deg K$^4$ | 377°K |
| IV | Commercial-soda-lime glass having an Indium Oxide Coating 3,500 angstroms in thickness on a surface<br>t = 0.73; r = 0.85 | 0.62 | x=69.8 × 10$^{10}$ watts$^{-1}$cm$^2$ deg K$^4$ | 496°K |
| V | Commercial-soda-lime glass having a Tin Oxide Coating 2,600 angstroms in thickness on a surface<br>t = 0.60; r = 0.85 | 0.51 | x=58 × 10$^{10}$ watts$^{-1}$cm$^2$ deg K$^4$ | 674°K |
| VI | Borosilicate glass having an Indium Oxide Coating 3,500 angstroms in thickness on a surface | | | |
| VII | Borosilicate glass having a Tin Oxide Coating 4,200 angstroms in thickness on a surface<br>t = 0.74; r = 0.85 | 0.63 | x=70.8 × 10$^{10}$ watts$^{-1}$cm$^2$ deg K$^4$ | 498°K |

Referring to Table I, it can be seen that a cover plate having a product of (1) reflectance coefficient ($r$) in the infrared wavelength range of about 2 to 15 microns and (2) transmittance coefficient ($t$) for solar radiation in the wavelength range of about 0.3 to 2.1 microns of tor having an even higher saturation temperature.

In the practice of the invention, it is recommended for optimum results, but not limited thereto, that absorbers having a selective surface and an emissivity coefficient ($e$) of about 0.50 be used with the cover plates constructed according to the principles of the invention.

Using the solar heat collector constructed in accordance to the teachings of this invention, the prior art disadvantages can be minimized if not eliminated. More particularly, (1) the solar heat collector of this invention does not have to be precision built to focus the solar energy on the absorber surface and is therefore less expensive to construct; (2) the solar heat collector of this invention does not have to be coordinated with the movement of the sun and is therefore less expensive to construct; (3) the cover plate of the solar heat collector of this invention preferably has no uncoated areas on the surface of the glass plate thereby preventing the infrared energy from escaping and (4) cover plates coated with tin oxide and indium oxide according to the teaching of the above-identified U.S. Patents will not peel from the cover plate surface at elevated temperatures.

The teachings of this invention can be used with any of the prior art designed solar heat collectors such as the type disclosed in U.S. patent application Ser. No. 450,703 filed even date in the name of Pandit G. Patil and entitled "Solar Heat Collector Window" which teachings are hereby incorporated by reference.

Figure 4:
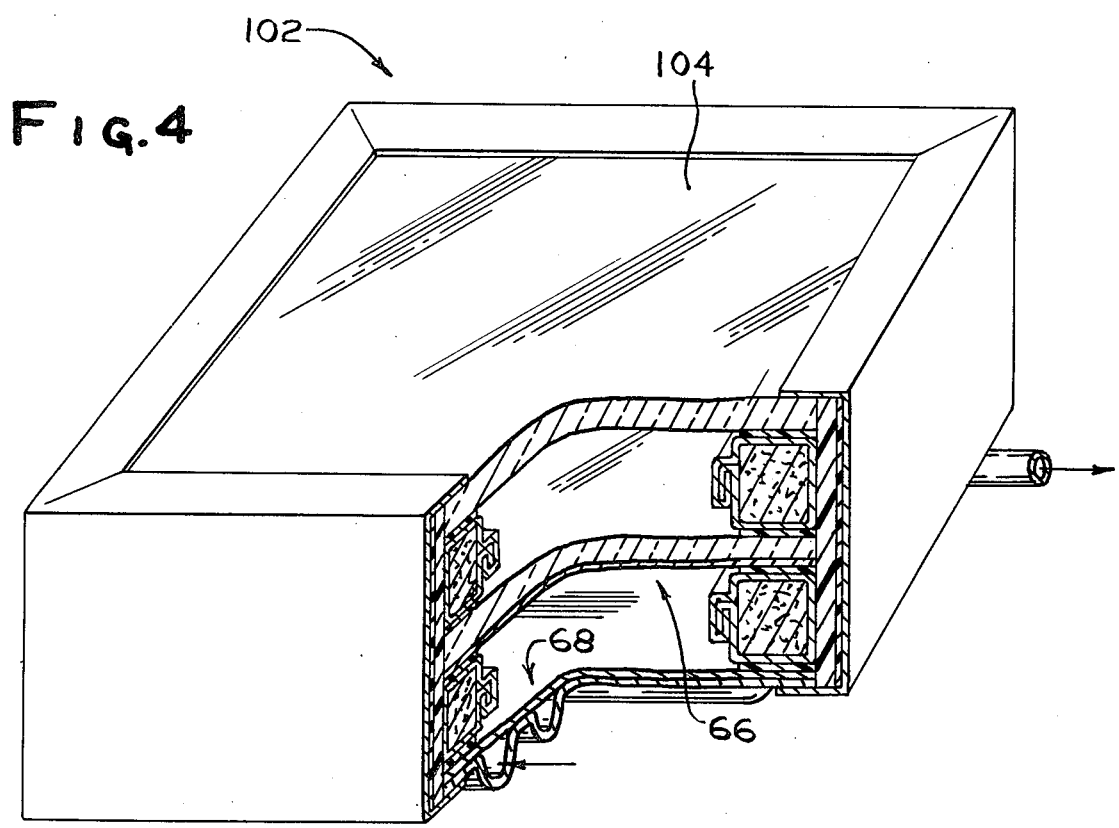
FIG. 4 is an isometric view of an alternate type of solar heat collector window constructed in accordance with the teachings of the invention and having portions removed for purposes of clarity.

Shown in FIGS. 3, 4, and 5, are various types of solar heat collectors embodying teachings of this invention. As can be appreciated, the solar heat collectors are presented for illustration purposes and the invention is not limited thereto.

Shown in FIG. 3 is a solar heat collector window 64 of the type disclosed in the above mentioned U.S. patent application Ser. No. 450,703 filed even date. The collector window 64 includes a cover plate 66 advantageously mounted in spaced relation to an absorber 68. The cover plate 66 has a coating 70 e.g., tin oxide, or indium oxide, on a piece of comercial-soda-lime glass or borosilicate glass 72 applied in a manner disclosed in the above mentioned U.S. Patents. The coating provides the cover plate 66 with (1) a transmittance coefficient ($t$) to solar energy in the wavelength range 0.3 to 2.1 microns and (2) a reflectance coefficient ($r$) infrared energy in wavelength range of between 2 to 9 microns such that the product of the ($rt$) is equal to or greater than about 0.25.

The absorber 68 is a piece of heat conductive material 74 e.g., copper or aluminum, having a selective or non-selective surface 76. A conduit 78 is advantageously provided on outer surface 80 of the absorber 68 for recirculating a heat absorbing medium. The heat absorbing medium as it is recirculated through the conduit 78 is heated by conduction.

The cover plate 66 and the absorber 68 are separated at their marginal edges by a metal spacer element 82 such as the type disclosed in U.S. Pat. No. 2,684,266. The spacer element 82 includes a tubular portion of generally rectangular cross section that is filled with a desiccant material 84 such as granular or powdered silica gel. The spacer element 82 extends completely around and between the marginal edges of the cover plate 66 and absorber 68.

Opposed surfaces 86 and 88 of the spacer element 82 are adhered to marginal surfaces 90 and 92 of the cover plate 66 and absorber 68 respectively, by a thin continuous film of a moistureresistant adhesive 94.

A resilient moisture-resistant strip 96 with a layer of mastic 97 adhered thereto, such as disclosed in U.S. Pat. No. 2,974,377, is bonded to the peripheral edge e.g., flat side 98 of the metal spacer element 82 and the peripheral edges of the absorber 68 and cover plate 66.

A channel member 100 of essentially U-shaped cross section also extends completely around the perimeter of the windows to protect its edges. The channel member 100 generally includes several sections of channeling that are joined or butted together at their ends.

The distance between the absorber and cover plate is not critical to the practice of the invention. However, to reduce heat loss by mechanisms other than radiation e.g., conduction, the recommended distance between the cover plate and absorber is about ½ inch.

Referring to FIG. 4, there is shown another type of solar heat collector window 102. The solar heat collector 102 of FIG. 4 is similar in construction to the solar heat collector window 64 of FIG. 3 with the exception that an additional plate 104 is mounted in spaced relation to cover plate 66. The plate 104 may be made of (1) uncoated glass or (2) coated glass. The additional plate 104 reduces heat loss due to convection.

To reduce heat losses due to conduction, the solar heat collector windows 64 and 102 of FIGS. 3 and 4, respectively, may be mounted in a heat insulating box such as the type disclosed in the above-mentioned U.S. patent application Ser. No. 450,703 filed even date.

Referring to FIG. 5, there is shown a solar heat collector conduit 110 having an outer pipe 112 and an inner pipe 114. The outer pipe 112 is constructed in accordance with the teaching of the invention. For example, the outer pipe 112 may be made of commercial-soda-lime glass or borosilicate glass 116 having a coating 118 e.g., tin oxide or indium oxide, to provide the outer pipe 112 with an ($rt$) of equal to or greater than about 0.25.

The inner pipe 114 acts as the absorber to heat a heat absorbing fluid 120 as it moves through the inner pipe 114.

As can be appreciated to further reduce heat loss to the solar heat collectors shown in FIGS. 3, 4, and 5, the space between the absorber and cover plate may be provided with a negative pressure.

By practicing this invention, solar heat collectors can be constructed having a high saturation temperature ($T_s$). In the construction of solar heat collectors, saturation temperature is considered an important parameter because the difference between the saturation temperature and the absorber temperature controls the rate of heat transfer into the absorber.

What is claimed is:
1. A solar heat collector, comprising:
   a solar and infrared energy absorber;
   a cover plate capable of passing solar energy;
   a coating on said cover plate to provide said cover plate with a transmittance coefficient ($t$) for solar radiation and a reflectance coefficient ($r$) for infrared energy in a wavelength range of about 2 to 15 microns wherein the product of ($r$) and ($t$) is greater than about 0.45 and wherein said coating is indium oxide, tin oxide or a mixture of tin oxide and indium oxide; and
   means for mounting said cover plate in spaced relation to said absorber.
2. The solar heat collector as set forth in claim 1 wherein the cover plate is a piece of commercial soda-lime-glass.
3. The solar heat collector as set forth in claim 2 wherein the coating is tin oxide having a thickness of about 2,000 – 5,000 angstroms.

4. The solar heat collector as set forth in claim 2 wherein the coating is indium oxide having a thickness of about 1,000 – 20,000 angstroms.

5. The solar heat collector as set forth in claim 1 wherein the cover plate is a piece of borosilicate glass and 6. The solar heat collector as set forth in claim 5 wherein the coating is tin oxide having a thickness of about 2,000 – 5,000 angstroms.

7. The solar heat collector as set forth in claim 5 wherein the coating is indium oxide having a thickness of about 1,000 – 20,000 angstroms.

8. The solar heat collector as set forth in claim 1 wherein said solar energy absorber is a first conduit and said cover plate is a second conduit and said mounting means includes:

means for mounting the first conduit inside and spaced from said second conduit.

9. The solar heat collector as set forth in claim 1 wherein said absorber is a plate and said mounting means includes means for mounting said plate in spaced relation to said cover plate to relate conduction and convection heat losses.

10. The solar heat collector as set forth in claim 1 wherein the cover plate is a piece of glass wherein the piece of glass has an iron oxide content less than about 0.06% by weight.

11. A method of making a solar heat collector, comprising the steps of:

providing a solar and infrared energy absorber;

providing a cover plate capable of passing solar energy;

provide a coating on the cover plate to provide the cover plate with a transmittance coefficient ($t$) for solar radiation and reflectance coefficient ($r$) for infrared energy in a wavelength range of about 2 to 15 microns wherein the product or ($r$) and ($t$) is greater than about 0.45 and wherein said coating is indium oxide, tin oxide or a mixture of tin oxide and indium oxide; and mounting the absorber in spaced relation to the cover plate.

* * * * *

UNITED STATES PATENT OFFICE
CERTIFICATE OF CORRECTION

Patent No. 3,981,293　　　　　　　　　　　Dated September 21, 1976

Inventor(s)　Frank Howard Gillery

It is certified that error appears in the above-identified patent and that said Letters Patent are hereby corrected as shown below:

Claim 5, line 3, delete "and" and insert a period (.), after "glass".

Claim 9, line 4, delete "relate" and insert -- reduce --.

Claim 11, line 8, after "and" insert -- a --.

*Signed and Sealed this*

Twenty-fifth *Day of* January 1977

[SEAL]

Attest:

RUTH C. MASON
*Attesting Officer*

C. MARSHALL DANN
*Commissioner of Patents and Trademarks*